Dec. 9, 1947.  E. B. FERRELL  2,432,092
RELAY TESTING DEVICE
Filed Sept. 2, 1943  5 Sheets-Sheet 1
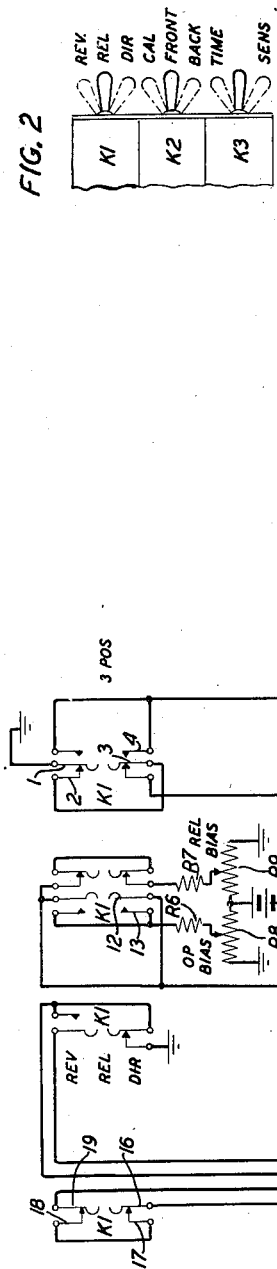
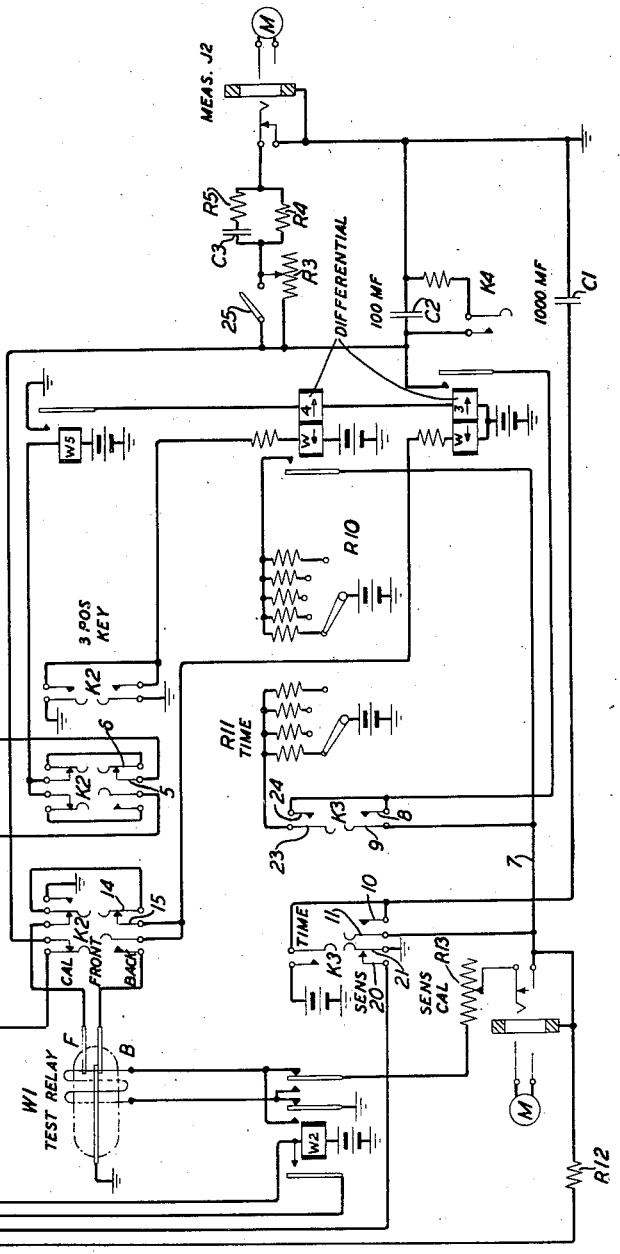
INVENTOR
E.B. FERRELL
ATTORNEY Dec. 9, 1947.　　　　　E. B. FERRELL　　　　　2,432,092
RELAY TESTING DEVICE
Filed Sept. 2, 1943　　　5 Sheets-Sheet 2
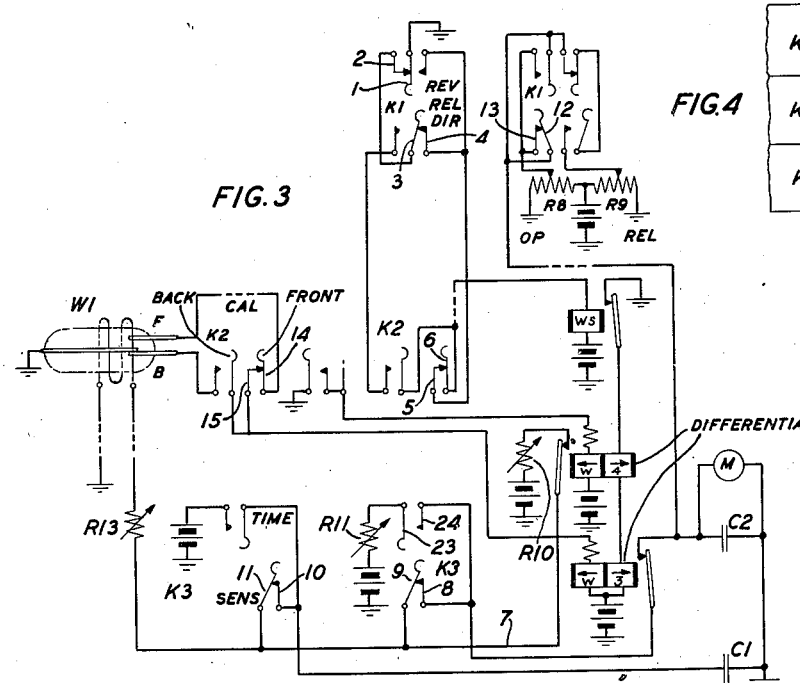
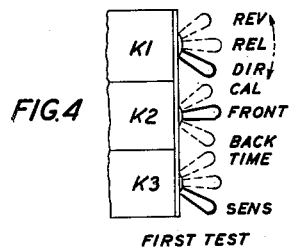
FIG.4 — FIRST TEST
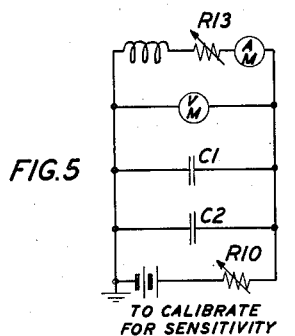
FIG.5 — TO CALIBRATE FOR SENSITIVITY
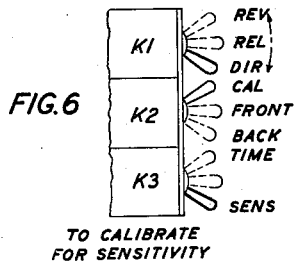
FIG.6 — TO CALIBRATE FOR SENSITIVITY
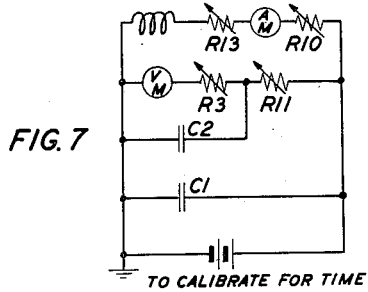
FIG.7 — TO CALIBRATE FOR TIME
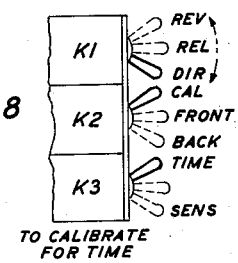
FIG.8 — TO CALIBRATE FOR TIME
INVENTOR
E. B. FERRELL
BY John Attall
ATTORNEY Dec. 9, 1947.  E. B. FERRELL  2,432,092
RELAY TESTING DEVICE
Filed Sept. 2, 1943  5 Sheets-Sheet 3

FIG. 9

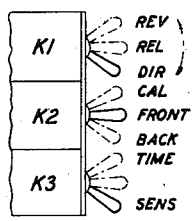

FIRST TEST

FIG. 10

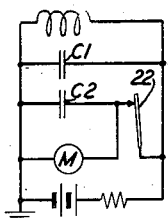

TO MEASURE
A.T. TO GET TO
FRONT CONTACT.
ENERGIZATION ON
CHARGING CYCLE

FIG. 11

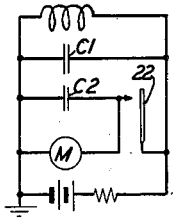

MOVEMENT OF
REED INTO CONTACT
WITH F.
READ METER

FIG. 12

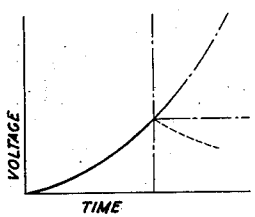

FIG. 13

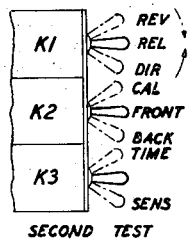

SECOND TEST

FIG. 14

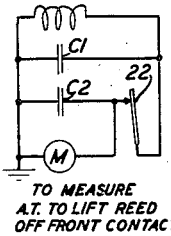

TO MEASURE
A.T. TO LIFT REED
OFF FRONT CONTACT.
DE-ENERGIZATION ON
DISCHARGING CYCLE

FIG. 15

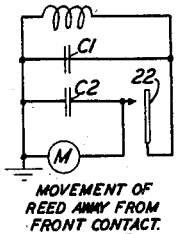

MOVEMENT OF
REED AWAY FROM
FRONT CONTACT.
READ METER

FIG. 16

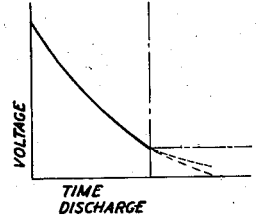

FIG. 17

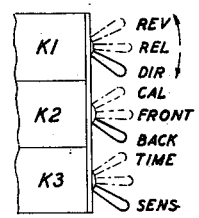

THIRD TEST

FIG. 18

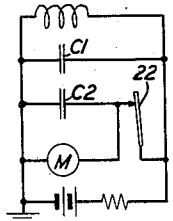

TO MEASURE
A.T. TO LIFT REED
OFF BACK CONTACT.
ENERGIZATION ON
CHARGING CYCLE

FIG. 19

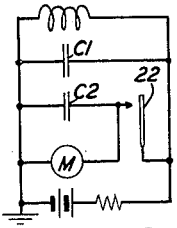

MOVEMENT OF
REED AWAY FROM
BACK CONTACT.
READ METER

FIG. 20

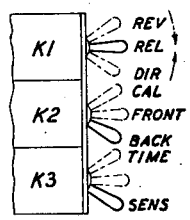

FOURTH TEST

FIG. 21

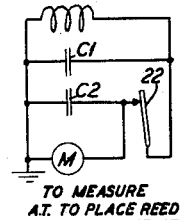

TO MEASURE
A.T. TO PLACE REED
ON BACK CONTACT.
DE-ENERGIZATION ON
DISCHARGING CYCLE.

FIG. 22

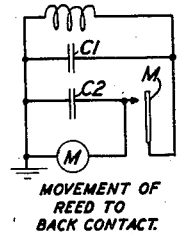

MOVEMENT OF
REED TO
BACK CONTACT.
READ METER

INVENTOR
E. B. FERRELL
BY
ATTORNEY

Dec. 9, 1947.  E. B. FERRELL  2,432,092
RELAY TESTING DEVICE
Filed Sept. 2, 1943  5 Sheets-Sheet 4
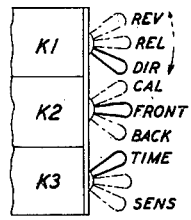
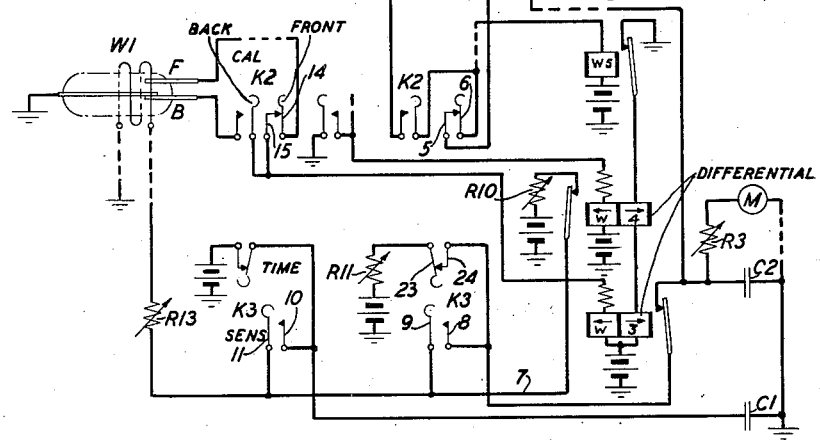
INVENTOR
E. B. FERRELL
BY
ATTORNEY Dec. 9, 1947.   E. B. FERRELL   2,432,092
RELAY TESTING DEVICE
Filed Sept. 2, 1943   5 Sheets-Sheet 5

FIG. 25

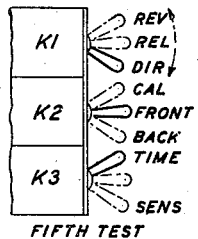

FIFTH TEST

FIG. 26

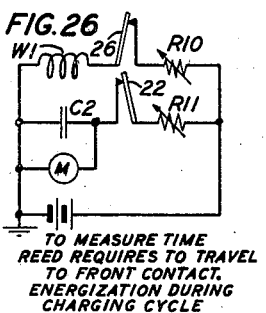

TO MEASURE TIME
REED REQUIRES TO TRAVEL
TO FRONT CONTACT.
ENERGIZATION DURING
CHARGING CYCLE

FIG. 27

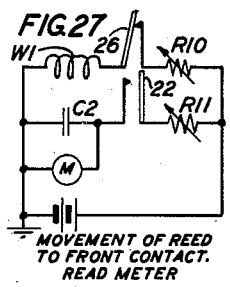

MOVEMENT OF REED
TO FRONT CONTACT.
READ METER

FIG. 28

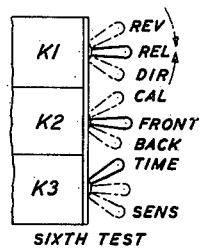

SIXTH TEST

FIG. 29

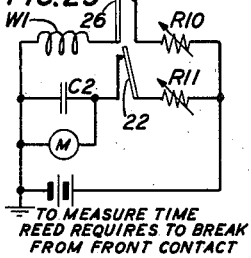

TO MEASURE TIME
REED REQUIRES TO BREAK
FROM FRONT CONTACT

FIG. 30

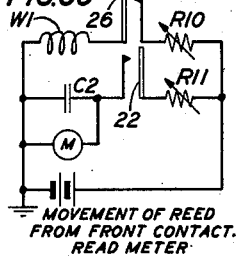

MOVEMENT OF REED
FROM FRONT CONTACT.
READ METER

FIG. 31

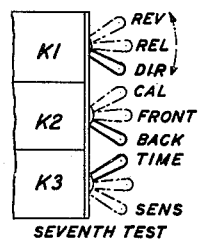

SEVENTH TEST

FIG. 32

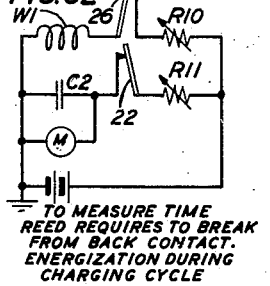

TO MEASURE TIME
REED REQUIRES TO BREAK
FROM BACK CONTACT.
ENERGIZATION DURING
CHARGING CYCLE

FIG. 33

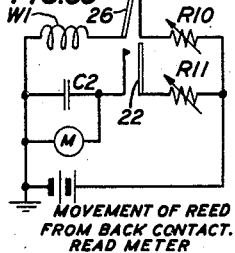

MOVEMENT OF REED
FROM BACK CONTACT.
READ METER

FIG. 34

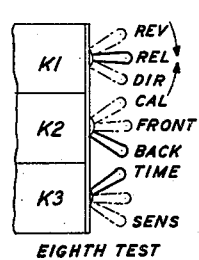

EIGHTH TEST

FIG. 35

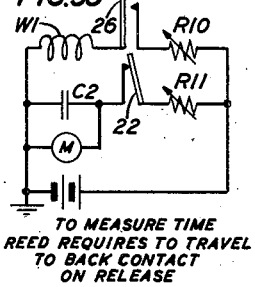

TO MEASURE TIME
REED REQUIRES TO TRAVEL
TO BACK CONTACT
ON RELEASE

FIG. 36

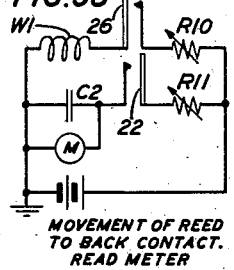

MOVEMENT OF REED
TO BACK CONTACT.
READ METER

INVENTOR
E. B. FERRELL
BY
ATTORNEY

Patented Dec. 9, 1947

2,432,092

UNITED STATES PATENT OFFICE 2,432,092

RELAY TESTING DEVICE

Enoch B. Ferrell, Chatham, N. J., assignor to Bell Telephone Laboratories, Incorporated, New York, N. Y., a corporation of New York Application September 2, 1943, Serial No. 500,935

7 Claims. (Cl. 175—183)

This invention relates to testing systems and particularly to electrical testing systems for determination of the capabilities of small current electromagnetic apparatus such as relays.

The object of the invention is to provide means for automatically, slowly and smoothly, altering the potential applied to a piece of electrical apparatus and in response to the operation thereof to halt further change until an indication of the point reached can be recorded.

Fundamentally the testing means consists of a large capacity condenser and a battery for charging the condenser to a potential higher than that which applied to the terminals of a relay will cause its operation. The relay whose sensitivity is to be tested is connected across the condenser and then the condenser is charged through a resistance of a value which will cause the potential of the condenser to rise at the rate desired. The condenser actually consists of two sections so that when the relay operates, one section of the condenser is disconnected from the charging circuit and will, therefore, be charged only to the potential which caused the relay to operate. A meter connected to this section of the condenser which is disconnected from the charging circuit may be calibrated to read the potential thereof or it may be calibrated to read ampere turns directly since the number of ampere turns which caused the relay under test to operate bears direct relation to the potential applied to the terminals thereof.

The reverse operation—that of measuring the sensitivity of the relay or release is done in the same manner. The two sections of the condenser are fully charged. The condenser is then discharged through a resistance selected to determine the rate of discharge. When the relay releases on this gradually diminishing potential applied to its winding one section of the condenser to which the meter is connected will be disconnected from the discharge circuit and the steady indication of the meter thereafter will give the value of the potential applied to the relay or the number of ampere turns on which the relay released.

A reversing means is provided so that the relay may be tested with current flowing in either direction through its windings.

A feature of the invention is a means for slowly and uniformly changing the potential applied to the terminals of an electrical device under test and means controlled by the response of such device for recording the potential at which said device responded. In accordance with this feature a storage means used for operating an indicating means is connected to the device under test and is then disconnected therefrom on the response of the device so that it is no longer affected by the potential applied to such device but maintains its condition as established at the instant of response.

Another feature of the invention is the use of a pair of large capacity condensers normally connected in parallel to control the voltage applied to the test terminals of a testing device with means for disconnecting one of said condensers from the test circuit so that the voltage reached may be fixed for observation purposes.

Another feature is the use of an electrolytic condenser and a high quality condenser normally connected in parallel for providing means to slowly and regularly change the potential supplied to a device to be tested with means to disconnect the said high quality condenser upon the operation of the device under test for observation purposes. In accordance with this feature it has been found convenient to use an electrolytic condenser where a large capacitance is needed but it has also been found that such a condenser will not retain its charge as well as a high quality condenser such as the paper wound condenser. Therefore, the electrolytic condenser which may be of comparatively small size is used as the main agency in controlling the rate of potential change and a paper or other high quality condenser is used as the auxiliary means for retaining the charge for a period of time sufficiently long to make an accurate observation.

Another feature of the invention is a means for measuring the time taken for a relay to operate or release after its energization or its deenergization consisting of a condenser charging or discharging circuit which is automatically broken upon the operation or release of the relay providing an opportunity for the potential of the condenser to be determined. The charging and discharging rate of the condenser being known the time involved is determined. The meter used for determining the potential of the condenser may be calibrated directly in time units.

Another feature of the invention is a control circuit in a testing device. When for instance it is desired to make a series of different tests each sequentially starting from a condition established as a result of the operations carried out during a previous test it would require an undue complication of manually operated keys to make the necessary circuit changes. In accordance with the present invention a two winding relay is used so that the same effect may be secured in different manners and in accordance with the different conditions established. In a specific example given by way of illustration it is desired to open a certain circuit at the conclusion of each of a plurality of tests. Consequently the said relay is employed to close this circuit at the beginning of each test and to open it at the conclusion thereof. In one test it may be desired to determine when a contact of a relay under test is made and in a succeeding test it is desired to determine when such contact is again opened. To do this the relay employed in the test set is first energized through a first of its windings to start the first test and then deenergized through the energization of a second of its windings to signal the conclusion of the test. From this point the relay is then energized through the deenergization of the said first of its windings to start the second test and then deenergized through the deenergization of its second winding to signal the conclusion of the said second test.

More broadly stated a feature of the invention consists in the use of a double winding relay which may be operated by having its two windings each in a different condition of energization and which may be released by having its two windings each in a like condition of energization. Such a relay may be said to operate in a plurality of cycles while being energized through the sequential energization of its windings in a single cycle of all possible combinations thereof. Specifically there are four possible combinations of the energized conditions of the windings and during a cycle wherein these four conditions are sequentially established the armature of the relay moves through two complete cycles of the positions which it may assume. Thus a relay going through a full cycle of energizing combinations produces two cycles of operations.

The drawings consist of five sheets having thirty-six figures, as follows:

Fig. 1 is a complete circuit diagram of the circuit arrangement of the present invention;

Figs. 2, 4, 6, 8, 9, 13, 17, 20, 23, 25, 28, 31 and 34 are fragmentary profile representations of the three principal testing keys showing the positions of the various key lever handles at different stages of the testing operations;

Figs. 3 and 24 are schematic circuit diagrams in which the circuit of Fig. 1 has been reduced to a much simpler form. Fig. 3 shows the essentials for the sensitivity tests and Fig. 24 shows the essentials for the time tests;

Figs. 5 and 7 are fundamental schematic circuit diagrams showing only the essential circuit connections established for calibration of the meter used for sensitivity tests and time measurement tests respectively;

Figs. 10, 11, 14, 15, 18, 19, 21, 22, 26, 27, 29, 30, 32, 33, 35 and 36 are fundamental schematic circuit diagrams showing only the essential circuit connections established for making a series of sensitivity and time measurement tests;

Figs. 12 and 16 are graphical representations of the change in potential with time under certain circuit conditions.

In general each circuit diagram is accompanied with a profile drawing of the testing keys to indicate the positions of such keys to produce the circuit conditions which are shown. Where the fundamental schematics are shown a number of figures are grouped together. Thus Figs. 9, 10, 11 and 12 form one group, the profile drawing of the keys in Fig. 9 showing how the keys have been manipulated, the fundamental schematic, Fig. 10 showing the circuit connections established thereby, and the fundamental schematic Fig. 11 showing the circuit connections established as a result of the test. Fig. 12 shows the potential changes involved, indicating the use of potential after the keys have been thrown as in Fig. 9 and the change which takes place when the circuit changes as in Fig. 12.

Certain of the fundamental schematic figures are duplicates of each other but that is because they have been reduced to essentials. It is believed to be more helpful to a clear understanding of the invention to show these figures in groups rather than economize in the number of figures.

The testing circuit of the present invention is shown in the form of a circuit diagram in Fig. 1. Fig. 2 is a diagrammatic representation of the three principal keys employed showing the key lever handles in solid black for the position in which each may be at any given time and in dot and dash outline for alternative positions. Each one of the three keys is shown in Fig. 2 to be in its normal position. In the circuit diagram of Fig. 1 the three keys are designated K1, K2 and K3 respectively and a fourth key used for auxiliary purposes is designated K4. Key K1 has a plurality of operating spring combinations, all shown in the same horizontal level. Likewise the various operating spring combinations of key K2 are shown on a lower horizontal level and the operating spring combinations of key K3 are on a still lower horizontal level. In this circuit diagram all operating spring combinations are shown in their normal positions.

All resistance elements are designated by the letter R. Of these most are of fixed value but those marked R10 and R11 are each under control of a manually adjustable switch whereby different values may be fixed to suit conditions. Resistances R8 and R9 are of fixed value but are shown with a sliding contact whereby they may be employed as potentiometers.

A number of relays are shown each designated by the letter W. The relay W1 is the relay under test and is here shown as a glass sealed reed contact unit which may be operated by a surrounding coil. Details of such a unit may be found in Patent 2,303,933, granted to D. A. S. Hale, December 1, 1942. This unit is provided with both a front and a back contact, though the type provided with only a front contact may be tested with equal facility.

The relay W2 is for reversing the direction of current flow in the winding of the relay under test. The relays W3 and W4 are important control units and by their use and particularly cyclic operation of relay W3 considerable simplification in the key arrangements may be made.

A number of condensers are shown and each is designated by the letter C. The condenser C1 is a large capacity condenser and may be of low quality. It may for example be of 1000 microfarads capacity and for the purpose of conserving space be of the electrolytic type. The condenser C2 is of lower capacity but must be of high quality since it must maintain its charge. It is by way of example a paper wound condenser (or a bank of such condensers connected in parallel) of 100 microfarads capacity.

There are also provided two testing jacks J1 and J2 by which a meter M may be inserted in the circuit at various points for purposes which will be described in detail hereinafter. The meter may be in the form of a microammeter and as will appear hereinafter may be calibrated in several different manners.

Fundamentally a test is made by manipulating the key lever handles in a given combination whereupon battery through a given resistance value according to the adjustment of R10 is connected to the two condensers C1 and C2 in parallel with the winding of the relay under test in parallel with these condensers. When the condensers have charged up to that point where the potential across the winding of the relay under test is just sufficient to supply the ampere turns to operate the relay the smaller of the two condensers will be automatically disconnected from the charging circuit with the meter bridged across it so that the potential reached (or the ampere turns if the meter is so calibrated) may be read. Special means are provided to prevent the reading of the meter from changing or from changing at a rate which would render the reading of the meter inaccurate.

In relays of the nature of the one shown where the moving contact member is a reed there may be a difference in the number of ampere turns which will cause the reed to break contact with its back contact and the number of ampere turns which will drive the reed into contact with its front contact. It is possible to move and maintain the reed to an intermediate position where it makes contact with neither its back nor its front contact, and this is true in both the energizing and the releasing movements of the reed. Consequently this test set is adapted to determine four conditions, first, the number of ampere turns required to move the reed away from its back contact, second, the number of ampere turns required to move the reed into contact with its front contact, third, the number of ampere turns on a decreasing scale reached when the reed moves away from its front contact, and fourth, the number of ampere turns on a decreasing scale reached when the reed comes again into contact with its back contact. Such tests are ordinarily designated sensitivity tests but tests of a similar nature may be made to determine the time taken for similar movements.

By the aid of a schematic circuit diagram, Fig. 3, the first test will be described in detail. In this test it is desired to determine the number of ampere turns required to drive the reed of the relay under test to its front contact. The keys are adjusted as indicated in Fig. 4. First key K3 is moved to its lower position and thereafter key K1 is moved downwardly. This last movement of key K1 starts the test. A circuit may be traced from ground, contacts 1 and 2 and contacts 3 and 4 of key K1, contacts 5 and 6 of key K2, the winding of relay W5 to battery. Relay W5 operates and closes an obvious circuit for the right-hand windings of relay W4 and W3 whereby these relays will operate, their left-hand windings being open at this time. Battery is now connected through a selected value of resistance R10, thence through the front contact and armature of relay W4 to conductor 7. Here the circuit divides and extends in a first branch through contacts 8 and 9 of key K3, armature and front contact of relay W3, and condenser C2 to ground. The meter M is bridged across the condenser C2. A second branch of the circuit extends through contacts 10 and 11 of key K3 to condenser C1 and thence to ground. A third branch extends through the resistance R13 and the winding of the relay W1 under test to ground. Thus condensers C1 and C2 are connected in parallel with the winding of relay W1. Resistance R4 is a fixed multiplier and R3 is an auxiliary adjustable multiplier for the meter M. Resistance R13 is a compensating resistance useful in adjusting the scale of the meter.

A connection from the front contact of relay W3 extends through contacts 12 and 13 of key K1 to the potentiometer point resistance R8 whereby a given potential may be applied to the meter M. This is for the purpose of preventing a rapid drift of the meter, for it will be understood that after the condenser C2 is charged to a certain potential and the relay W3 releases the condenser C2 will discharge, through the winding of the meter M. If, by means of the potentiometer, the potential of the condenser C2 is matched and the potentiometer has a current carrying capacity equal to or greater than the current requirements of the meter M then the condenser will maintain its charge and the drift of the meter will be zero. If it is desired to obtain a steady reading of the meter M the test may be repeated until through adjustment of the potentiometer of resistance R8 this goal is attained.

In practice, the operator soon becomes expert in the manipulation of the apparatus and an adjustment of this potentiometer is quickly made which will result in an extremely slow drift of the meter M or oftentimes no drift at all. Also it will be noted that a reading of the meter requires a very short interval so that a moderate drift is no hindrance to making accurate observations.

When the circuits above described are first closed through the movement of key K1 the condensers C1 and C2 begin to charge slowly, the rate depending on the value of resistance R10. When the relay W1 operates and the reed makes contact with its front contact a circuit is established from ground through the said reed and front contact, contacts 14 and 15 of key K2, lefthand winding of relay W3 to battery. Relay W3 is differentially wound and now that both windings are energized the relay releases. Therefore condenser C2 is disconnected from the charging circuit at the point where relay W1 operates. The meter should be read at this point. Actually the meter is observed during the whole operation and if there is a downward drift after the operation of relay W1 the highest point reached is taken as the proper reading. The meter is read when it appears to stop moving. In this case the reading slowly increases in accordance with the charging of the condenser and then upon the release of relay W3 begins to slowly decrease. If the manipulation of resistance R8 has been accurate the reading of the meter slowly increases and then upon the release of relay W3 remains stationary. In practice it is very common to have the potentiometer exactly adjusted so that the reading of the meter is maintained stationary in this manner.

After the release of relay W3 the large condenser C1 continues to charge until the current in the circuit of relay W1 is limited only by the resistances R10 and R13.

If key K1 is now returned to its normal middle position the release value of the relay W1 will be tested, that is the number of ampere turns on a decreasing scale that will be reached when the reed leaves its front contact. Upon the release of key K1 to normal relay W5 is released. This results in the release of relay W4, up to now energized through its right-hand winding, and the operation of relay W3 since it was up to now released through the energization of both its windings. Since its right-hand winding is now deenergized but the energization of its left-hand winding is maintained it will become energized. Therefore condenser C2 is bridged across condenser C1 and since it is much smaller in capacity than condenser C1 will immediately become charged to the same capacity as C1. The battery connection through the armature and front contact of relay W4 is opened and hence the two condensers C1 and C2 will begin to discharge through the winding of relay W1. An auxiliary discharge circuit to accelerate this operation is shown in Fig. 1 as extending from conductor 7 through resistance R12, contacts 16, 17, 18 and 19 of key K1, and contacts 20 and 21 of key K3 to ground.

As the condensers C1 and C2 discharge a point will be reached where the relay W1 releases, that is, the reed will leave its front contact. This will open the circuit of the left-hand winding of relay W3 and this relay will now release disconnecting condenser C2 from the discharge circuit so that a reading of the meter may be taken. The resistance R9 forms a potentiometer for the meter drift control on the discharging operation.

It will be noted that in the foregoing description of the testing operation that relay W3 has had its windings energized in a cycle of the four possible combinations and that during this cycle it has moved its armature in two complete cycles of operation. It may further be noted that the meter M in the form of a microammeter is used with its multipliers R4 and R3 as a voltmeter and as such measures the potential across the condenser C2. This meter may be calibrated to read ampere turns since the number of ampere turns depends directly on the potential placed across the winding of the relay to be tested. To measure ampere turns directly all that is necessary is to set R13 at a value such that R13 plus the resistance of the relay under test equals $10^r \times N$ where N is the number of turns and $r$ is any integer.

In Fig. 1, a key K4 is shown. This may be used to completely discharge condenser C2 after the test last described if it is desired to make a new test immediately thereafter and before condenser C2 could have become discharged otherwise.

In the following figures the circuits set up under different conditions are shown as skeleton schematic circuit diagrams each of which is accompanied with a figure similar to Fig. 2 to show the operation of the keys K1, K2 and K3, and each may be easily checked with the complete circuit shown in Fig. 1. Thus Fig. 5 and its accompanying Fig. 6 show the circuit for calibrating the meter for sensitivity tests. In this figure the meter to be calibrated is marked VM since it performs the function of a voltmeter. A similar meter truly calibrated in microamperes or milliamperes is shown as the meter AM. The calibration is made by changing the value of resistance R10 and marking the scale of the meter VM with figures (or recording on a chart) the values of ampere turns derived from the reading of meter AM and the known number of turns of the coil of the relay under test. The calibration ordinarily can be checked at any single setting of R10. The calibration resistance R13 is used to adjust the circuit so that the readings of the scale of the meter VM will come at appropriate markings thereon. After this calibration is made the resistance is left unchanged. The condensers C1 and C2 and the contacts of the relay under test play no part in the calibration operation.

Fig. 7 and its accompanying Fig. 8 show the arrangements set up for calibrating the meter for time measurements. Since it is desired to know what time it takes for the relay under test to make any one or more of the movements heretofore described a circuit such as that shown in Fig. 7 is set up. The capacity of the condenser C2 being known the time required to bring it up to a certain potential is known and therefore a measure of the potential reached on any given operation involving only this condenser will be a measure of the time involved and the meter may be calibrated accordingly. The resistance R11 is changed so that the potential which will be applied to the condenser C2 for each adjustment of resistance R11 will be known from which the time constants may be figured and the meter VM may be marked accordingly. The resistance R3 is used like the resistance R13 in Fig. 5 to adjust the scale of the meter. The relay under test is placed in series with an ammeter AM and resistance R10 so that ampere turns may be noted for convenient collating of data but this plays no actual part in the calibration operation. The condenser C1 is placed directly across the battery and therefore plays no part in the calibration. The readings of the meter VM are merely made for various adjustments of the resistance R11 and are then interpreted in accordance with the known capacity of condenser C2.

These times may be checked roughly in each case by noting with the aid of a stop-watch or some other more accurate means the time which elapses between the establishment of this circuit by the downward movement of key K1 and the reaching of a steady reading by the meter VM.

Figs. 9 to 16, inclusive, show the tests heretofore described in detail with Figs. 3 and 4. Figs. 9 to 12, inclusive, show the first half of the test in which the ampere turns to move the reed into contact with its front contact are noted. Fig. 9 shows the position of the keys, the test being started by the movement of the key lever handle of K1 to its down position (or to its up position if the current in the coil is to be reversed). The circuit of Fig. 10 shows the circuit established at that time, and the first part of the graph of Fig. 12 up to the vertical dot and dash line shows the charging rate of the condensers C1 and C2. When the relay brings its reed into contact with its front contact the circuit of condenser C2 is disconnected from the charging circuit as indicated in Fig. 11 by the switch 22, which actually represents the armature and front contact of relay W3 and the meter may be read at this time. In the graph of Fig. 12 the continued charging of condenser C1 is indicated by the heavy dot and dash line. The light horizontal dot and dash line indicates the reading of the meter under conditions where the potentiometer resistance R8 is properly adjusted and the heavy dotted line indicates the rapid drift of the meter when the potentiometer of resistance R8 is not used. After this test has been made the key K1 is returned to its normal middle position as indicated in Fig. 14. Thereupon the discharging circuit according to Fig. 14 is set up and the potential across the coil of the relay under test begins to fall as indicated in Fig. 16. When the reed of the relay under test leaves its front contact then the circuit of Fig. 15 is established, that is, the condenser C2 is disconnected from the normal discharging circuit. Thereupon the meter is read. Under ideal conditions the reading of this meter will be steady as indicated by the horizontal light dot and dash line of Fig. 17. Under very poor conditions the meter will drift downwardly as indicated by the heavy dotted line in Fig. 16.

Another series of tests will be to determine the number of ampere turns required to force the reed out of contact with its back contact on increasing energization and the number of ampere turns reached when the reed again comes into contact with its back contact, on decreasing energization. The manner of manipulating the keys and the circuits fundamentally established thereby are shown in Figs. 17 to 22, inclusive. It will be noted that Figs. 18, 19, 21 and 22 are the same as Figs. 9, 10, 14 and 15 respectively, though the manner in which these circuits are established is different. Looking back at Fig. 3 it will be noted that with key K2 operated to its lowermost position, relay W3 will first be energized through its left-hand winding, will then respond to the movement of the reed of the relay under test away from its back contact by releasing through the deenergization of such left-hand winding, will next be energized through its right-hand winding and will then respond to the movement of the reed into contact with its back contact by releasing through the energization of both its windings. Figures like Fig. 12 and Fig. 16 are not repeated since the graphs would be the same.

Fig. 24 is a schematic circuit diagram similar to that of Fig. 3 showing how a time test is made. With the keys thrown as indicated in Fig. 23 the test is started upon the movement of key K1 to its lower position (or its upper position where the test is to be made on reversed current through the winding of relay W1 under test). A circuit may first be traced from ground, contacts 1, 2, 3 and 4 of key K1, contacts 5 and 6 of key K2, winding of relay W5 to battery. Relay W5 operates and energizes both relays W4 and W3 through their right-hand windings. Relay W4 establishes a circuit from battery, the selected value of resistance R10, front contact and armature of relay W4, conductor 7, resistance R13 and the winding of relay W1 under test to ground. Relay W3 closes a circuit from battery through a selected value of resistance R11, contacts 23 and 24 of key K3, armature and front contact of key K1 to condenser C2 to ground. The meter M is in parallel with the condenser C2 as before, only now switch 25 (of Fig. 1) has been opened and resistance R3 which was used for adjusting the scale of the meter is shown in series therewith. The conditions are, therefore, as depicted in Fig. 26 where the contact 26 represents the armature and front contact of relay W4. Upon the operation of relay W1 and when the reed makes contact with its front contact a circuit is established from ground, the reed and front contact of relay W1, contacts 14 and 15 of key K2, left-hand winding of relay W3 to battery. Relay W3 being now energized through both its windings releases its armature and terminates further charging of the condenser, the circuit condition now produced being depicted in Fig. 27. The meter M may now be read and since it has been calibrated in time units will indicate the time taken from the beginning of the energization of relay W1 to the movement of the reed into contact with its front contact. Since relay W4 remains energized the energization of relay W1 will continue until it is completed, that is, the coil is energized to a point beyond that required to barely move the reed to its front contact.

The sixth test, shown by Figs. 28 to 30, is now made by the movement of key K1 to its middle or normal position as indicated by Fig. 28. As a result relay W5 is released whereupon the right-hand windings of relays W4 and W3 are deenergized. Relay W4 releases since its left-hand winding is also deenergized but relay W3 closes its armature to its front contact due to energization of its left-hand winding through the reed and front contact of relay W1. The circuit of Fig. 29 is produced and relay W1 releases. In time, the reed will leave its front contact. From the movement of key K1 to the position indicated in Fig. 28 to the movement of the reed of relay W1 away from its front contact the condenser C2 will be in its charging circuit. At the end of this time the left-hand winding of relay W3 will be deenergized and relay W3 will release, thereby producing the circuit of Fig. 30. The meter M may now be read and its time scale will indicate the time which has elapsed between the deenergization of the coil of relay W1 and the movement of the reed away from its front contact.

The key K2 may now be moved to the position indicated in Figs. 31 and 34 and the seventh and eighth tests may be made. These are detailed in Figs. 31 to 36, inclusive. In the seventh test the time required for the reed to move away from its back contact is measured and in the succeeding eighth test the time required for the reed to reach the back contact from full energization of the relay is measured.

In this series of tests relay W3 is first energized through its left-hand winding, second, released through energization of both its windings, third, energized through its right-hand winding alone, and fourth, released through deenergization of both its windings. This combination of operations is shown in Figs. 32, 33, 35 and 36. Relay W4 through a like combination of energizing conditions operates apparently in direct response to the position of key K1 as will be seen by the schematic circuit diagrams in Figs. 25 to 26, inclusive.

It may be mentioned that the time of operation and release of relays W3 and W4 affects the time measurements but that these relays are of the reed type and are very fast acting and the time corrections are constant.

What is claimed is:

1. In a testing system, a device to be tested having a movable element, a source of slowly and regularly changing potential connected in parallel with said device and having a range greater than and including the operating range of said device, said device on increasing change of potential operating to move said movable element into an operated position at some point during said increasing change and on decreasing change of potential operating to release said movable element to its unoperated position at some point during said decreasing change, a potential measuring means normally connected in parallel with said source through said movable means whereby the change of potential as applied to said measuring means is halted in response to an operation of said device.

2. In a testing system, a large capacity condenser, a relay to be tested, a source of slowly changing potential having a range above that at which said relay will operate and below that at which said relay will release, means for including said condenser in parallel with said relay and said source of potential for measuring the potential at which said relay will operate during a rise in potential while said condenser is charging or the potential at which said relay will release during a fall in potential while said condenser is discharging, means responsive to the operation or the release of said relay for disconnecting said condenser from said charging or said discharging circuit, and means for measuring the potential of said condenser.

3. In a testing system, a device to be tested having an energizing coil and a movable element responsive thereto provided with electrical contacts providing a closed circuit in each position thereof which is opened by the movement of said element to its other position, a large capacity condenser, a resistance and a battery, said battery being of a potential greater than the operating potential of said device, the said energizing coil of said device being connected in parallel with said condenser, switching means for making and breaking a series connection including said resistance, said battery and said condenser for slowly and regularly changing the potential of said condenser until said device in response thereto has changed the position of said movable element, an auxiliary condenser in parallel with said first condenser, said parallel connection being controlled by said movable element electrical circuits, and means for indicating the potential established on said auxiliary condenser when said parallel connection is opened by a movement of said movable element.

4. In a testing system, a device to be tested having an energizing coil and a movable element responsive thereto provided with electrical contacts providing a closed circuit in each position thereof which is opened by the movement of said element to its other position, a large capacity condenser, a resistance unit having a plurality of different resistance values, a battery of a potential greater than the operating potential of said device, the said energizing coil of said device being connected in parallel with said condenser, switching means for making and breaking a series connection including said resistance unit, said battery and said condenser for slowly and regularly changing the potential of said condenser until said device in response thereto has changed the position of said movable element, other switching means for selectively including said various resistance values in said series circuit to control the said rate of change of potential of said condenser, an auxiliary condenser in parallel with said first condenser, said parallel connection being controlled by said movable element electrical circuits, and means for indicating the potential established on said auxiliary condenser when said parallel connection is opened by a movement of said movable element.

5. In a testing system, a device to be tested having an energizing coil and a movable element responsive thereto provided with electrical contacts providing a closed circuit in each position thereof which is opened by the movement of said element to its other position, a large capacity electrolytic condenser for slowly and regularly changing a testing potential applied to said device, a battery of a potential greater than the operating potential of said device, means for connecting said battery, the said energizing coil of said device and said condenser in parallel to test said device, a storage means for recording the potential of said device at the time of the movement of said movable element comprising a smaller capacity high quality condenser, a normal parallel connection between said condensers controlled by the said electrical contacts of said movable element whereby said smaller condenser is isolated in response to a movement of said movable element when said slowly changing potential reaches the operating potential of said device and when said device in response thereto operates, and means for indicating the potential of said storage means.

6. In a testing system, a large capacity condenser, a relay to be tested, a source of slowly changing potential having a range above that at which said relay will operate and below that at which said relay will release, said relay having contacts to close one circuit upon operation and another circuit upon release, a differential relay having two windings, means for energizing said differential relay through one of said windings during a change of potential of said source, said differential relay in its operated condition acting as means for including said relay, said source and said condenser in parallel, said relay acting through its said contacts on response to said changing source of potential as means for deenergizing said differential relay by causing the joint energization of the windings of said differential relay, said condenser acting as a means for measuring the potential at which said relay will operate during a rise in potential of said source and the potential at which said relay will release during a fall in potential of said source, said differential relay in its released position acting to disconnect said condenser from said parallel circuit and means for measuring the potential of said condenser.

7. In a system for testing the operating and release values of said relay in a cycle consisting of first determining the potential at which said relay will operate and thereafter determining the potential at which said relay will release, a large capacity condenser, a comparatively small capacity condenser, a relay to be tested having an energizing coil, an armature, and a front and a back contact controlled thereby, a battery having a potential greater than the potential which applied to the said energizing coil will result in its operation, a differential relay which in its operated position acts to place said comparatively small capacity condenser in parallel with said large capacity condenser and in its non-operated position acts to isolate said comparatively small capacity condenser, means for measuring the potential of said small condenser, switching means having alternative positions in one of which said two condensers, said relay energizing coil and said battery are placed in parallel to provide a charging circuit for said condensers and in the other of which positions a resistance is substituted for said battery to provide a discharging circuit for said condensers, said differential relay being controlled by the contacts of said relay under test, said front and back contacts each acting to energize the second winding of said differential relay to cause the release thereof and the consequent isolation of said small condenser on the operation and the release of said relay under test, whereby the operation of said switching means to one position causes one test to be made and the circuits prepared for the other of said tests.

ENOCH B. FERRELL.

REFERENCES CITED

The following references are of record in the file of this patent:

UNITED STATES PATENTS

| Number | Name | Date |
|---|---|---|
| 1,560,544 | Crisson | Nov. 10, 1925 |
| 1,971,196 | McNairy | Aug. 21, 1934 |
| 1,944,211 | Brodie | Jan. 23, 1934 |
| 2,210,324 | Miller | Aug. 6, 1940 |
| 1,526,337 | Hartley | Feb. 17, 1925 |
| 1,487,267 | Retallack | Mar. 18, 1924 |
| 1,941,253 | Dowd | Dec. 26, 1933 |